(12) United States Patent
Heller et al.

(10) Patent No.: US 7,129,369 B2
(45) Date of Patent: Oct. 31, 2006

(54) PREPARATION OF AMINO-FUNCTIONAL ORGANOPOLYSILOXANES

(75) Inventors: Anton Heller, Simbach (DE); Johann Bindl, Burghausen (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 11/068,139

(22) Filed: Feb. 28, 2005

(65) Prior Publication Data

US 2005/0215806 A1 Sep. 29, 2005

(30) Foreign Application Priority Data

Mar. 23, 2004 (DE) ...................... 10 2004 014 218

(51) Int. Cl.
*C07F 7/04* (2006.01)

(52) U.S. Cl. .................................... 556/413
(58) Field of Classification Search ................ 556/413
See application file for complete search history.

(56) References Cited

U.S. PATENT DOCUMENTS

| 4,177,200 A | 12/1979 | Razzano et al. |
| 5,041,586 A | 8/1991 | Beck et al. |
| 5,118,724 A | 6/1992 | Frances et al. |

FOREIGN PATENT DOCUMENTS

| EP | 0 742 263 | 11/1996 |
| EP | 0 757 074 | 2/1997 |
| EP | 0 628 589 | 3/1997 |
| EP | 1 096 059 | 5/2001 |
| WO | WO 03/016380 | 2/2003 |
| WO | WO 03/016380 A2 | 2/2003 |

OTHER PUBLICATIONS

McGrath et al., "Kinetics, Mechanisms, and Synthesis Studies of Aminopropyl Terminated Polydimethylsiloxane Oligomers," Makromol. Chem., Macromol. Symp. 6, 67-80 (1986).
Spinu et al., "Incorporation of Pendant Amine Groups on Poly(Dimethylsiloxane) Chains via Co-Equilibration Anionic Polymerization Reactions," Polym. Prepr. 29 (1), 123-125 (1988).
Laita, et al., "Polymerisation von Iktamethylzklo-tetrasiloxan mit Thermolabilen Katalysatoren," Journal of Polymer Science: Part C, No. 16, 669-677 (1967).

*Primary Examiner*—Samuel Barts
(74) *Attorney, Agent, or Firm*—Brooks Kushman P.C.

(57) ABSTRACT

A process for preparing amino-functional organopolysiloxanes comprising (i) mixing aminosilanes of the general formula $$R_aQ_bSi(OR^1)_{4-(a+b)},$$

where R and $R^1$ are hydrogen or optionally substituted hydrocarbyl, a is 0, 1 or 2, b is 1, 2 or 3, and a+b is $\leq 3$, Q is $-R^5-[NR^6(CH_2)_n]_eN(R^6)_2$, where $R^5$ is a hydrocarbyl diradical and $R^6$ is hydrogen, hydrocarbyl, or acyl, e is 0, 1, 2, 3 or 4, n is 2, 3, 4, 5 or 6, with organosilicon compounds selected from siloxanes comprising units $$R_d((OR)^1)_f SiO_{\frac{4-(d+f)}{2}} \text{ and } R_c SiO_{\frac{4-c}{2}}$$

or silanes $R_c Si(OR^1)_{4-c}$, where c is 0, 1, 2 or 3, d is 0, 1 or 2, f is 1, 2 or 3, with the proviso that d+f is $\leq 3$, basic catalysts selected from alkali metal hydroxides, alcoholates and siloxanolates, and optionally, alcohols $H-[O(CHR^2)_p]_m OR^3$, where $R^2$ and $R^3$ are hydrogen or hydrocarbyl, p is 2, 3 or 4, and m is 0 or an integer from 1 to 100, (ii) reacting by heating to 70–100° C., and (iii) subsequently, neutralizing the basic catalysts by addition of neutralizing agents which form salts which are soluble in the amino-functional organopolysiloxanes thus obtained.

14 Claims, No Drawings

PREPARATION OF AMINO-FUNCTIONAL ORGANOPOLYSILOXANES

BACKGROUND OF THE INVENTION

1. Field of the Invention

This invention relates to a process for preparing amino-functional organopolysiloxanes.

2. Background Art

The preparation of amino-functional organopolysiloxanes via alkali-catalyzed equilibration has been described in many publications and represents the state of the art. Catalysts such as alkali metal, ammonium, or phosphonium hydroxides or sil(ox)anolates are known for example from J. POLYM. SCI., Part C No. 16, 669–677 (1967); MAKROMOL. CHEM., MACROMOL. SYMP. 6, 67–80 (1986); and POLYM. PREPR. 29 (1), 123–125 (1988). EP 628589 B1 describes the use of strontium hydroxide or barium hydroxide together with sodium borates or phosphates.

Metal hydroxides have the disadvantage that, in the processes described therein, they have to be neutralized with acids at the end of the reaction to deactivate them. This leads to undesirable cloudiness and saltlike precipitates. Ammonium hydroxides and phosphonium hydroxides can be thermally destroyed without addition of an acid, and their fragments removed by distillation. It is thus possible to prepare clear amine oils. But this process is more costly in terms of energy and time. The oils thus produced, moreover, have a high odor level due to residual trialkylamines.

U.S. Pat. No. 5,041,586 describes the preparation of diorganopolysiloxanes with alkaline catalysts by heating at high temperatures and neutralizing the alkaline catalyst by the use of trimethylsilyl phosphates. A specific mixture of trimethylsilyl phosphates is used that has the following composition: 10–30% by weight of mono(trimethylsilyl) phosphate, 65–85% by weight of bis(trimethylsilyl) phosphate, and 2–7% by weight of tris(trimethylsilyl) phosphate.

Furthermore, equilibration reactions have the disadvantage of a high rate of formation of cyclic oligosiloxanes, such as octamethyltetrasiloxane and decamethylpentasiloxane in amounts of 10–15% by weight, which then in turn have to be removed by distillation, depending on the application sector.

WO 03/016380 A2 discloses the acid-catalyzed preparation of an amino-functional polysiloxane (A) by reacting an aminosilane containing an aminoalkyl group and at least one silicon-bonded alkoxy group, with a carboxylic acid and a silanol-functional polysiloxane (B). The aminosilane is partially present in the form of the carboxylate salt which acts as a catalyst for a polycondensation between (A) and (B). Amine oils prepared by this method have a very low byproduct level of cyclic oligosiloxanes, but the products have a yellowish color and also exhibit insufficient storage stabilities with regard to viscosity.

SUMMARY OF THE INVENTION

The present invention provides an economical process for preparing amino-functional organopolysiloxanes as colorless, odorless and viscosity-stable products having a very low level of cyclics such as cyclooctamethyltetrasiloxane (D4), without energy- and time-intensive workup processes such as thermal aftertreatment or filtration. These and other objects are achieved by the invention.

DETAILED DESCRIPTION OF THE PREFERRED EMBODIMENT(S)

The present invention accordingly provides a process for preparing amino-functional organopolysiloxanes, comprising (i) mixing aminosilanes (A) of the general formula $$R_a Q_b Si(OR^1)_{4-(a+b)} \quad (I),$$

where each R may be the same or different and represents a hydrogen atom or a monovalent unsubstituted or fluorine-, chlorine- or bromine-substituted $C_1$- to $C_{18}$-hydrocarbyl radical, $R^1$ represents a hydrogen atom or a $C_1$- to $C_4$-alkyl radical which may be substituted by an ether oxygen atom, a is 0, 1 or 2, preferably 0 or 1, b is 1, 2 or 3, preferably 1, with the proviso that the sum total of a+b is $\leq 3$, Q represents a group of the general formula $$—R^5—[NR^6(CH_2)_n]_e N(R^6)_2 \quad (II),$$

where $R^5$ is a bivalent linear or branched $C_1$- to $C_{18}$-hydrocarbyl radical, each $R^6$ may be the same or different and represents a hydrogen atom, an unsubstituted or fluorine-, chlorine-, bromine-, hydroxyl- or $C_1$–$C_5$-alkoxy-substituted $C_1$- to $C_{18}$-hydrocarbyl radical or acyl radical, e is 0, 1, 2, 3 or 4, and n is 2, 3, 4, 5 or 6, with organosilicon compounds (B) selected from the group consisting of siloxanes (B') comprising units of the general formula $$R_d((OR)^1)_f SiO_{\frac{4-(d+f)}{2}} \text{ and} \quad (III)$$

$$R_c SiO_{\frac{4-c}{2}} \quad (IV)$$

and silanes (B") of the general formula $$R_c Si(OR^1)_{4-c} \quad (V),$$

where R and $R^1$ are each as defined above, c is 0, 1, 2 or 3, preferably 2, d is 0, 1 or 2, preferably 2, f is 1, 2 or 3, preferably 1, with the proviso that the sum total of d+f is $\leq 3$, in the presence of basic catalysts (C) selected from the group consisting of alkali metal hydroxides, alkali metal alcoholates and alkali metal siloxanolates, and optionally alcohols (D) of the general formula $$H—[O(CHR^2)_p]_m OR^3 \quad (VI),$$

where each $R^2$ may be the same or different and represents a hydrogen atom or a $C_1$- to $C_{18}$-hydrocarbyl radical, $R^3$ represents a hydrogen atom, a $C_1$- to $C_{30}$-hydrocarbyl radical, preferably a $C_6$- to $C_{14}$-hydrocarbyl radical, preferably a $C_{10}$- to $C_{12}$-hydrocarbyl radical, or a group of the general formula —(C=O)—$R^4$, where $R^4$ is an $R^2$ or O—$R^2$ radical, p is 2, 3 or 4, and m is 0 or an integer from 1 to 100, (ii) reacting the mixture by heating to 70–100° C., preferably 70–90° C., and (iii) subsequent to reaction (ii), neutralizing the basic catalysts by addition of neutralizing agents which combine with the basic catalysts to form salts which are soluble in the amino-functional organopolysiloxanes thus obtained.

The process of the present invention provides amino-functional organopolysiloxanes comprising siloxane units of the general formula $$R_a Q_b SiO_{\frac{4-(a+b)}{2}},\qquad\text{(VII)}$$

siloxane units of the general formula $$R_c SiO_{\frac{4-c}{2}},\qquad\text{(VIII)}$$

and siloxane units of the general formula $$Z_g R_d SiO_{\frac{4-(d+g)}{2}},\qquad\text{(IX)}$$

where Q represents a radical of the general formula $$-R^5-[NR^6(CH_2)_n]_e N(R^6)_2 \qquad\text{(II) and}$$

Z represents a radical of the general formula $$-OR^1 \text{ (X) and/or } -[O(CHR^2)_p]_m OR^3 \qquad\text{(X')},$$

and

R, $R^1$, $R^2$, $R^3$, $R^5$, $R^6$, a, b, c, d, e, m, n and p are each as defined above and g is 1, 2 or 3, preferably 1, with the proviso that the sum total of a+b is $\leq 3$ and that the sum total of d+g is $\leq 3$.

The term "organopolysiloxanes" shall, in the realm of the present invention, comprehend not only polymeric siloxanes but also dimeric and oligomeric siloxanes.

When the process of the present invention is carried out without use of alcohols (D), then the Z radical in the amino-functional organopolysiloxanes of the present invention will be a radical of the formula (X). When the process is carried out using alcohols (D), there will be at least some of the Z radicals which are (iso)oxyalkyl radicals of the formula (X') as well as radicals of the formula (X). When using alcohols (D), the reaction (ii) will preferably be carried out at a pressure of 1 to 500 hPa, more preferably 1 to 400 hPa and most preferably 1 to 200 hPa. When the process is carried out without use of alcohols (D), then the reaction (ii) will preferably be carried out at a pressure of 1 to 1000 hPa, more preferably 100 to 900 hPa, still more preferably 300 to 700 hPa, and most preferably 400 to 600 hPa.

Examples of hydrocarbyl radicals R are alkyl radicals such as the methyl, ethyl, n-propyl, isopropyl, 1-n-butyl, 2-n-butyl, isobutyl, tert-butyl, n-pentyl, isopentyl, neopentyl, tert-pentyl, hexyl, such as n-hexyl, heptyl, such as n-heptyl, octyl, such as n-octyl, isooctyl, and 2,2,4-trimethylpentyl, nonyl, such as n-nonyl, decyl, such as n-decyl, dodecyl, such as n-dodecyl, and octadecyl, such as n-octadecyl radicals; cycloalkyl radicals such as the cyclopentyl, cyclohexyl, cycloheptyl and methylcyclohexyl radicals; aryl radicals such as the phenyl, naphthyl, anthryl and phenanthryl radicals; alkaryl radicals such as the o-, m-, and p-tolyl, xylyl and ethylphenyl radicals; and aralkyl radicals such as the benzyl, α-phenylethyl and β-phenylethyl radicals. The hydrocarbyl radicals R may contain an aliphatic double bond. Examples are alkenyl radicals such as the vinyl, allyl, 5-hexen-1-yl, E-4-hexen-1-yl, Z-4-hexen-1-yl, 2-(3-cyclohexenyl)ethyl and cyclododeca-4,8-dienyl radicals. Preferred R radicals having an aliphatic double bond are vinyl, allyl, and 5-hexen-1-yl. Preferably, however, not more than 1% of the R hydrocarbyl radicals contain a double bond.

Examples of substituted R radicals are haloalkyl radicals such as the 3,3,3-trifluoro-n-propyl, 2,2,2,2',2',2'-hexafluoroisopropyl, and heptafluoroisopropyl radicals, and haloaryl radicals such as the o-, m- and p-chlorophenyl radicals. Preferably, R is a univalent hydrocarbyl radical having 1 to 6 carbon atoms, and methyl is particularly preferred.

Examples of $R^1$ hydrocarbyl radicals are alkyl radicals such as the methyl, ethyl, n-propyl, isopropyl, 1-n-butyl, 2-n-butyl, isobutyl and tert-butyl radicals, with $C_1$–$C_3$-alkyl radicals being preferred. Examples of alkyl radicals substituted by an ether oxygen are the methoxyethyl and ethoxyethyl radicals. Preferred examples of the $-OR^1$ radical are the hydroxyl and methoxy radicals.

$R^5$ is preferably a bivalent $C_2$–$C_6$-hydrocarbyl radical. Examples of $R^5$ bivalent hydrocarbyl radicals are saturated straight- or branched-chain or cyclic alkylene radicals such as methylene and ethylene, as well as propylene, butylene, pentylene, hexylene, 2-methylpropylene, cyclohexylene and octadecylene, or unsaturated alkylene or arylene radicals such as hexenylene and phenylene, with n-propylene and 2-methylpropylene being particularly preferred.

Examples of R hydrocarbyl radicals other than those having an aliphatic double bond apply fully to $R^6$ hydrocarbyl radicals. Preferably, $R^6$ is a hydrogen atom, a methyl radical, a cyclohexyl radical, or an acyl radical, such as an acetyl radical.

Preferred examples of Q are: $H_2N(CH_2)_3-$, $H_2N(CH_2)_2 NH(CH_2)_3-$, $H_2N(CH_2)_2 NH(CH_2) CH(CH_3) CH_2-$, (cyclohexyl)NH(CH_2)_3-, $CH_3NH(CH_2)_3-$, $(CH_3)_2N (CH_2)_3-$, $C H_3CH_2NH(CH_2)_3-$, $(CH_3CH_2)_2N(CH_2)_3-$, $CH_3NH(CH_2)_2NH(CH_2)_3-$, $(CH_3)_2N(CH_2)NH(CH_2)_3-$, $CH_3CH_2NH(CH_2)_2NH(CH_2)_3-$, $(CH_3CH_2)_2N(CH_2)_2NH (CH_2)_3-$, and their partially or fully acylated forms.

Particularly preferred examples of Q are: $H_2N(CH_2)_3-$, $H_2N(CH_2)_2NH(CH_2)_3-$, (cyclohexyl)NH(CH_2)_3-, (acetyl)—NH(CH_2)_2NH(CH_2)_3-, and (acetyl)—NH (CH_2)_2 N(acetyl)(CH_2)_3-.

In the formula (I), it is preferred that a be 0 or 1 and b be 1. More preferably is a is 1.

Preferred examples of aminosilanes (A) are: $NH_2(CH_2)_2 NH_2(CH_2)_3SiCH_3(OCH_3)_2$, $NH_2(CH_2)_2NH_2(CH_2)_3Si (OCH_3)_3$, and $NH_2(CH_2)_3SiCH_3(OC_2H_5)_2$.

Examples of R hydrocarbyl radicals other than those having an aliphatic double bond apply fully to $R^2$ and $R^3$ hydrocarbyl radicals. $R^2$ is preferably a hydrogen atom or a $C_1$–$C_{18}$-alkyl radical. $R^3$ is preferably a hydrogen atom or a $C_1$–$C_{30}$-alkyl radical, preferably a $C_6$–$C_-$-alkyl radical and more preferably a $C_{10}$–$C_{12}$-alkyl radical.

The process of the present invention preferably utilizes siloxanes (B') as organosilicon compounds (B). The siloxanes (B') may be linear, branched or cyclic. Preference for use as siloxanes (B') is given to those of the general formula $$R^1 OR_2 SiO(R_2 SiO)_x SiR_2 OR^1 \qquad\text{(XI)}$$

where R is as defined above, $R^1$ is as defined above and preferably is a hydrogen atom, and x is an integer from 20 to 100.

The siloxane chain of the siloxanes of the above-indicated formula may, although generally not depicted by such formulae, contain internal siloxane units other than the diorganosiloxane units R$_2$SiO, and in addition to the latter. Examples of such other siloxane units, which are only usually present as impurities, are those of the formulae RSiO$_{3/2}$, R$_3$SiO$_{1/2}$ and SiO$_2$, where R is as defined above.

It is possible to use one kind of siloxane (B') or two or more kinds of siloxanes (B'). The siloxanes (B') preferably have a viscosity of 10 to 1000 mPa·s at 25° C., more preferably 30 to 200 mPa·s at 25° C.

The process of the present invention utilizes aminosilanes (A) in amounts which are preferably in the range from 0.1% to 20% by weight and more preferably in the range from 0.3% to 12% by weight based on the total weight of the organosilicon compounds (A) and (B) and, if used, the alcohols (D).

Examples of the alkali metal hydroxides used in the process of the present invention are potassium hydroxide and sodium hydroxide, sodium hydroxide being preferred. Preferred examples of alkali metal alcoholates are sodium methanolate and sodium ethanolate, while preferred examples of alkali metal siloxanolates are sodium siloxanolates.

The amount in which catalysts (C) are used is preferably in the range of 1 to 1000 ppm by weight, more preferably of 10 to 400 ppm by weight, and most preferably, 30 to 200 ppm by weight, all based on the total weight of the organosilicon compounds (A) and (B) and, if used, the alcohols (D). The amount in which sodium hydroxide is used is preferably in the range of 10 to 400 ppm, and more preferably 30 to 200 weight ppm, based on the total weight of the organosilicon compounds (A) and (B) and, if used, the alcohols (D).

Examples of alcohols (D) are methanol and room temperature liquid C$_6$- to C$_{14}$-alcohols which are not volatile under synthesis conditions, such as n-hexanol, n-heptanol, n-octanol, 2-ethylhexanol, n-decanol, and n-dodecanol, more preferably commercially available mixtures of C$_{10}$- to C$_{12}$-alcohols; and monoalkyl glycol ethers, preferably adducts of alcohol, ethylene oxide, propylene oxide and their copolymers, such as 2-methoxypropanol, 2-butoxyethanol, or a polyethoxylated fatty alcohol, preferably diethylene glycol monobutyl ether, dipropylene glycol monomethyl ether, n-hexyl glycol, propylene glycol monobutyl ether, or an isotridecyl alcohol ethoxylate having up to 3 ethylene oxide units. Particular preference is given to diethylene glycol monobutyl ether and dipropylene glycol monomethyl ether.

When alcohols (D) are used in the process, their quantity will be determined by the target viscosity to be achieved for the amino-functional organopolysiloxanes of the present invention. The amount of alcohols (D) is preferably in the range of 0% to 50% by weight and more preferably in the range of 0.1% to 5% by weight, all based on the total weight of the organosilicon compounds (A) and (B) and the alcohols (D).

When no alcohols (D) are used, the target viscosity of the amino-functional organopolysiloxanes is preferably controlled by the catalyst quantity, by application of vacuum, and/or by the deactivation of the catalyst after reaching the target viscosity. If desired, the viscosity trajectory may be monitored by in-line viscosity measurement techniques.

The process of the present invention can be carried out in the presence or absence of organic solvents. Examples of useful solvents are alcohols such as methanol, ethanol, n-propanol, and isopropanol; ethers such as dioxane, tetrahydrofuran, diethyl ether, and diethylene glycol dimethyl ether; chlorinated hydrocarbons such as dichloromethane, trichloromethane, tetrachloromethane, 1,2-dichloroethane, and trichloroethylene; hydrocarbons such as pentane, n-hexane, hexane isomer mixtures, heptane, octane, universal spirits, petroleum ether, benzene, toluene, and xylene(s); ketones such as acetone, methyl ethyl ketone, methyl isobutyl ketone; carbon disulfide; and nitrobenzene or mixtures of these solvents. The designation of solvent does not mean that all reaction components have to dissolve in it. The reaction can also be carried out in a suspension or emulsion of one or more reaction partners.

The reaction is preferably carried out at a temperature of 80–85° C. The reaction times are preferably in the range from 10 to 180 minutes and more preferably in the range from 30 to 90 minutes.

To deactivate the basic catalyst (C), neutralizing agents capable of forming product-soluble salts with the basic catalysts are introduced at the end of the reaction. Examples of such neutralizing agents are long-chain carboxylic acids which are liquid at room temperature, such as n-octanoic acid, 2-ethylhexanoic acid, n-nonanoic acid, and oleic acid; carbonic esters such as propylene carbonate, or carboxylic anhydrides such as octenylsuccinic anhydride. Further examples are triorganosilyl phosphates, preferably trimethylsilyl phosphates. Trimethylsilyl phosphates used are preferably compositions consisting essentially of 0–50% of monosilyl phosphate of formula: $[(CH_3)_3SiO](HO)_2P=O$ 20–100% of disilyl phosphate of formula: $[(CH_3)_3SiO]_2(HO)P=O$ 0–70% of trisilyl phosphate of formula: $[(CH_3)_3SiO]_3P=O$ the total amount being 100% by weight. Processes for preparing triorganosilyl phosphates and especially trimethylsilyl phosphates are described in the previously cited U.S. Pat. No. 5,041,586.

The required amount of the neutralizing agents, preferably trimethylsilyl phosphates, depends on the amount of basic catalyst used and is preferably in the range of 0.05% to 0.50% by weight and more preferably in the range of 0.15% to 0.30% by weight, all based on the total weight of the organosilicon compounds (A) and (B) and, if used, the alcohols (D). The neutralization can take place before or after the reaction mixture has cooled down.

The process of the present invention can be carried out as a batch, semicontinuous, or continuous operation.

The process of the present invention has the advantage that it is carried out under mild reaction conditions, for example low temperatures, and that the reaction times are not overly long. The process therefore has the advantage of being conservative of both energy and time. More particularly, it has the advantage that preferably less than 2% by weight of cyclic organopolysiloxanes are formed. It has the further advantage that the products obtained by the process of the invention are stable in storage; that is, there is no increase in viscosity during storage, the products do not turn cloudy, nor are any saltlike precipitates formed.

The use of alcohols (D) in the process of the present invention has the advantage that their use level makes it possible to control the viscosity of the end product amino-functional organopolysiloxanes.

Preferred amino-functional organopolysiloxanes obtained by the process of the present invention are linear and/or T-branched organopolysiloxanes, particular preference being given to linear organopolysiloxanes comprising C$_1$- to C$_{30}$-alkoxy or monoalkyl glycol ether groups and/or hydroxyl and/or alkyl end groups or, in the case of a=2, end groups Q of the general formula (II). The identity of the end groups per organopolysiloxane chain can be the same or different. The ratio of siloxane units of the general formula (VII) to siloxane units of the general formula (VIII) is preferably in the range from 1:10 to 1:30,000 and especially in the range from 1:20 to 1:700. The amine contents of the amino-functional organopolysiloxanes are preferably in the range from 0.001 to 2 mequiv/g measured as consumption of 1N hydrochloric acid in ml, per g of amino-functional organopolysiloxane when titrated to neutrality.

The amino-functional organopolysiloxanes of the present invention preferably have an average viscosity which is in the range of 50 to 100,000 mPas at 25° C., and more preferably in the range of 100 to 25,000 mPas at 25° C.

The process of the present invention preferably provides amino-functional organopolysiloxanes of the general formula

ZR$_2$SiO(R$_2$SiO)$_k$(RQSiO)$_l$SiR$_2$Z            (XII)

where R, Q and Z are each as defined above,
k is an integer from 50 to 700 and
l is an integer from 1 to 60.

In the formula (XII), it is to be understood that there may be k —(R$_2$SiO)— units and l —(RQSiO)— units distributed in the organopolysiloxane molecule in any desired manner, for example as a block or randomly.

The siloxane chain of the siloxanes of the above-indicated formula may, although generally not depicted by such formulae by those skilled in the art, contain internal siloxane units other than the diorganosiloxane units R$_2$SiO and in addition to the latter. Examples of such other siloxane units, which are usually only present as impurities, are those of the formulae RSiO$_{3/2}$, R$_3$SiO$_{1/2}$ and SiO$_2$, where R is as defined above.

When no alcohols (D) are used in the process of the present invention, the Z radical in the formula (XII) will be a radical of the formula (X), preferably a hydroxyl and/or methoxy radical. When alcohols (D) are used in the process of the present invention, there will be at least some of the Z radicals which are (iso)oxyalkyl radicals of the formula (X'), preferably alkoxy or monoalkyl glycol ether radicals, more preferably C$_{10}$–C$_{12}$-alkoxy radicals, in addition to radicals of the formula (X), which, again, are preferably hydroxyl and/or methoxy radicals.

The inventions accordingly provide amino-functional organopolysiloxanes of the general formula

ZR$_2$SiO(R$_2$SiO)$_k$(RQSiO)$_l$SiR$_2$Z            (XII)

where R and Q are each as defined above, each
Z represents a radical of the general formula

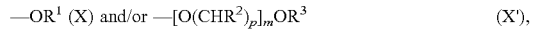

—OR$^1$ (X) and/or —[O(CHR$^2$)$_p$]$_m$OR$^3$            (X'), where R$^1$, R$^2$, R$^3$, p and m are each as defined above,
k is an integer from 50 to 700,
l is an integer from 1 to 60,
with the proviso that all or some of the Z radicals are radicals of the formula (X') where m is 0 and R$^3$ are C$_{10}$–C$_{12}$-alkyl radical or C$_{10}$–C$_{12}$-alkoxy radicals.

The C$_{10}$–C$_{12}$-alcohols used in the preparation of the abovementioned amino-functional organopolysiloxanes have the advantage that they are liquid at room temperature.

Acyl-containing products can be prepared by using acylated amino-functional silanes (A) or by reacting the aminoorganopolysiloxane of the present invention with acylating reagents such as carboxylic anhydrides, carboxylic esters, carboxylic acids, lactones or carbonates.

The amino-functional organopolysiloxanes of the present invention are useful for treating leather, batts, cellulose, fibers, textiles, nonwovens and tissues, as a constituent of defoamer formulations, as a wetting agent, as a paint additive, as a PU foam stabilizer, in the personal care industry as an active component in hair conditioners, shampoos and skin care compositions, and also as a constituent of polishing and coating compositions.

The amino-functional organopolysiloxanes can be used in organic solvent solution or in aqueous dispersion and preferably in the form of aqueous emulsions. The amino-functional organopolysiloxanes can be used in free amine or in salt form, for example as a chloride salt or a carboxylate salt produced by adding hydrochloric acid or the corresponding carboxylic acid.

Compositions containing the amino-functional organopolysiloxanes can contain further ingredients, such as surfactants, thickeners, rheology-modifying additives, perfumes, waxes, emollients, cleaning agents, lubricating oils, electrolytes, flavoring agents, biocides, active pharmaceutical or cosmetic materials.

EXAMPLE 1

A mixture of 1717.6 g of an OH-terminated polydimethylsiloxane having a viscosity of 80 mPas at 25° C., 50.0 g of N-(aminoethyl)aminopropyldimethoxymonomethylsilane and 35.5 g of diethylene glycol monobutyl ether is, while stirring, admixed with 1.8 g of a 20% solution of potassium hydroxide in methanol, and heated to 85° C. under nitrogen at 100 mbar. In the process, methanol present in the reaction mixture is distilled off. On reaching 85° C., the temperature and vacuum are maintained until there is no further increase in viscosity. After 120 minutes, the batch is neutralized with 2.4 g of a mixture of trimethylsilyl phosphates containing
3% by weight of mono(trimethylsilyl) phosphate,
74% by weight of bis(trimethylsilyl) phosphate, and
23% by weight of tris(trimethylsilyl) phosphate, and heating is discontinued. The clear colorless oil has a viscosity of 1463 mPas at 25° C. The determination of storage viscosities and D4 cyclics content are summarized in the table. The end product is stable in storage and has a low D4 cyclics content.

EXAMPLE 2

A mixture of 1717.6 g of an OH-terminated polydimethylsiloxane having a viscosity of 80 mPas at 25° C., 50.0 g of N-(aminoethyl)aminopropyldimethoxymonomethylsilane and 35.5 g of diethylene glycol monobutyl ether is, while stirring, admixed with 1.8 g of a 20% solution of sodium hydroxide in methanol, and heated to 85° C. under nitrogen at 100 mbar. In the process, methanol present in the reaction mixture is distilled off. On reaching 85° C., the temperature and vacuum are maintained until there is no further increase in viscosity. After 70 minutes, the batch is neutralized with 3.5 g of the mixture of trimethylsilyl phosphates of Example 1 and heating is discontinued. The clear colorless oil has a viscosity of 1828 mPas at 25° C. The determination of storage viscosities and D4 cyclics content are summarized in the table. The end product is stable in storage and has a low D4 cyclics content.

EXAMPLE 3

A mixture of 1717.6 g of an OH-terminated polydimethylsiloxane having a viscosity of 80 mPas at 25° C., 50.0 g of N-(aminoethyl)aminopropyldimethoxymonomethylsilane and 35.2 g of dipropylene glycol monomethyl ether is, while stirring, admixed with 1.8 g of a 20% solution of sodium hydroxide in methanol, and heated to 85° C. under nitrogen at 100 mbar. In the process, methanol present in the reaction mixture is distilled off. On reaching 85° C., the temperature and vacuum are maintained until there is no further increase in viscosity. After 70 minutes, the batch is neutralized with 3.5 g of the mixture of trimethylsilyl phosphates specified in Example 1 and heating is discontinued. The clear colorless oil has a viscosity of 3240 mPas at 25° C. The determination of storage viscosities and D4 cyclics content are summarized in the table. The end product is stable in storage and has a low D4 cyclics content.

EXAMPLE 4

A mixture of 1717.6 g of an OH-terminated polydimethylsiloxane having a viscosity of 80 mPas at 25° C., 50.0 g of N-(aminoethyl)aminopropyldimethoxymonomethylsilane and 37.4 g of 2-ethylhexanol is, while stirring, admixed with 1.4 g of a 20% solution of sodium hydroxide in methanol, and heated to 85° C. under nitrogen at 100 mbar. In the process, methanol present in the reaction mixture is distilled off. On reaching 85° C., the temperature and vacuum are maintained until there is no further increase in viscosity. After 80 minutes, the batch is neutralized with 3.5 g of the mixture of trimethylsilyl phosphates specified in Example 1 and heating is discontinued. The clear colorless oil has a viscosity of 705 mPas at 25° C. The determination of storage viscosities and D4 cyclics content are summarized in the table. The end product is stable in storage and has a low D4 cyclics content.

EXAMPLE 5

A mixture of 1706.3 g of an OH-terminated polydimethylsiloxane having a viscosity of 80 mPas at 25° C., 50.0 g of N-(aminoethyl)aminopropyldimethoxymonomethylsilane and 37.4 g of NAFOL® 1012 (alcohol mixture of $C_{10}$- and $C_{12}$-alcohols, commercially available from SASOL) is, while stirring, admixed with 1.4 g of a 20% solution of sodium hydroxide in methanol and heated to 85° C. under nitrogen at 100 mbar. In the process, methanol present in the reaction mixture is distilled off. On reaching 85° C., the temperature and vacuum are maintained for 90 minutes. Then, the batch is neutralized with 3.5 g of the mixture of trimethylsilyl phosphates specified in Example 1 and heating is discontinued. The clear colorless oil has a viscosity of 1255 mPas at 25° C. The determination of storage viscosities and D4 cyclics content are summarized in the table. The end product is stable in storage and has a low D4 cyclics content.

EXAMPLE 6

A mixture of 1745.8 g of an OH-terminated polydimethylsiloxane having a viscosity of 80 mPas at 25° C. and 50.9 g of N-(aminoethyl)aminopropyldimethoxymonomethylsilane is, while stirring, admixed with 0.9 g of a 20% solution of sodium hydroxide in methanol and heated to 80° C. under nitrogen at 500 mbar. In the process, methanol present in the reaction mixture is partially distilled off. On reaching 80° C., the temperature and vacuum are maintained for 90 minutes. Then, the batch is neutralized with 3.4 g of the mixture of trimethylsilyl phosphates specified in Example 1 and heating is discontinued. The clear colorless oil has a viscosity of 911 mPas at 25° C. The determination of storage viscosities and D4 cyclics content are summarized in the table. The end product is stable in storage and has a low D4 cyclics content.

Comparative Experiment 1 with Basic Catalysis:

Example 6 is repeated except that the reaction is carried out at 120° C. and 100 mbar instead of 80° C. and 500 mbar. A clear colorless oil having a viscosity of 2920 mPas at 25° C. is obtained. The determination of D4 cyclics content is summarized in the table. The D4 cyclics content is substantially higher than in Example 6.

Comparative Experiment 2 with Acidic Catalysis:

A mixture of 1717.6 g of an OH-terminated polydimethylsiloxane having a viscosity of 80 mPas at 25° C., 50.0 g of N-(aminoethyl)aminopropyldimethoxymonomethylsilane and 32.6 g of 1-dodecanol is, while stirring, admixed with 9.0 g of glacial acetic acid and heated to 80° C. under nitrogen at 100 mbar. In the process, methanol present in the reaction mixture is distilled off. On reaching 80° C., the temperature and vacuum are maintained for 180 minutes, thereafter the vacuum is broken with nitrogen, and the batch is cooled down to room temperature. The clear yellowish oil has a viscosity of 1780 mPas at 25° C. The determination of the storage viscosities and D4 cyclics content are summarized in the table. The viscosity increases substantially in the course of storage; that is, the end product is not stable in storage.

TABLE

Determination of storage viscosities and D4 cyclics contents

| Product of Example | Viscosity as prepared in mPas* | Viscosity after 26 days' storage at room temperature in mPas* | Viscosity after 26 days' storage at 50° C. in mPas* | Level of D4 cyclics in mol % Si from $^{29}$Si NMR |
|---|---|---|---|---|
| 1 | 1463 | 1581 | 1827 | 1.85 |
| 2 | 1828 | 1906 | 2170 | 1.49 |
| 3 | 3240 | 3039 | 2986 | 1.43 |
| 4 | 705 | 684 | 697 | 1.16 |
| 5 | 1255 | 1131 | 1086 | 0.73 |
| 6 | 911 | 1070 | 1450 | 0.26 |
| Comparative experiment 1 | 2920 | not determined | not determined | 5.92 |
| Comparative experiment 2 | 1780 | 12550 | 11000 | <0.05 |

*at 25° C.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for preparing amino-functional organopolysiloxanes comprising (i) mixing aminosilanes (A) of the general formula $$R_aQ_bSi(OR^1)_{4-(a+b)} \qquad (I),$$

where each R may be the same or different and is a hydrogen atom or a monovalent unsubstituted or fluorine-, chlorine- or bromine-substituted $C_1$- to $C_{18}$-hydrocarbyl radical, each $R^1$ is the same or different and is a hydrogen atom or a $C_1$- to $C_4$-alkyl radical which may be substituted by an ether oxygen atom, a is 0, 1 or 2, b is 1, 2 or 3,
with the proviso that the sum total of a+b is $\leq 3$,
where each Q may be the same or different and is a group of the formula $$-R^5-[NR^6(CH_2)_n]_e N(R^6)_2 \qquad (II),$$

where each $R^5$ independently is a bivalent linear or branched $C_1$- to $C_{18}$-hydrocarbyl radical, each $R^6$ may be the same or different and is a hydrogen atom, an unsubstituted or fluorine-, chlorine-, bromine-, hydroxyl- or $C_1$-$C_5$-alkoxy-substituted $C_1$- to $C_{18}$-hydrocarbyl radical or acyl radical,
e is 0, 1, 2, 3 or 4,
n is 2, 3, 4, 5 or 6,
with organosilicon compounds (B) selected from the group consisting of siloxanes (B') comprising units of the formula $$R_d((OR)^1)_f SiO_{\frac{4-(d+f)}{2}}, \text{ and} \qquad (III)$$

$$R_c SiO_{\frac{4-c}{2}} \qquad (IV)$$

and silanes (B") of the formula $$R_c Si(OR^1)_{4-c} \qquad (V),$$

where
c is 0, 1, 2 or 3,
d is 0, 1 or 2,
f is 1, 2 or 3,
with the proviso that the sum total of d+f is $\leq 3$,
in the presence of at least one basic catalyst (C) selected from the group consisting of sodium hydroxide, sodium alkoxides, and sodium silanolates,
and optionally one or more alcohols (D) of the formula $$H-[O(CHR^2)_p]_m OR^3 \qquad (VI),$$

where each $R^2$ may be the same or different and is a hydrogen atom or a $C_1$- to $C_{18}$-hydrocarbyl radical,
each $R^3$ is the same or different and is a hydrogen atom, a $C_1$- to $C_{30}$-hydrocarbyl radical, or a group of the formula $-(C=O)-R^4$, where $R^4$ is an $R^2$ or $O-R^2$ radical,
p is 2, 3 or 4, and
m is 0 or an integer from 1 to 100,
(ii) reacting the mixture by heating to 70–100° C., and
(iii) subsequent to reacting (ii), neutralizing the basic catalysts by addition of neutralizing agents which combine with the basic catalysts to form salts which are soluble in the amino-functional organopolysiloxanes thus obtained,
wherein said reacting (iii) is carried out at a pressure in the range of from 1 to 200 hPa when alcohols (D) are present, and 300 to 700 hPa when alcohols (D) are not present.

2. The process according to claim 1 wherein said reacting (ii) is effected at 70 to 90° C.

3. The process of claim 1, wherein said reacting (ii) is carried out at a pressure in the range from 400 to 600 hPa when alcohols (D) are not used.

4. The process of claim 2, wherein said reacting (ii) is carried out at a pressure in the range from 400 to 600 hPa when alcohols (D) are not used.

5. The process of claim 1, wherein sodium hydroxide, sodium methanolate, sodium ethanolate or sodium siloxanolate are used as a catalyst (C).

6. The process of claim 1, wherein sodium hydroxide (C) is used in an amount of 30 to 200 ppm by weight, based on the total weight of said organosilicon compounds (A) and (B) and, if used, of the alcohol(s) (D).

7. The process of claim 1, wherein triorganosilyl phosphates are used as a neutralizing agent in said neutralizing (iii).

8. The process of claim 7, wherein the triorganosilyl phosphates used are trimethylsilyl phosphates.

9. The process according to claim 7 wherein the trimethylsilyl phosphates used are compositions consisting essentially of
0–50% of monosilyl phosphate of formula: $[(CH_3)_3SiO](HO)_2P=O$,
20–100% of disilyl phosphate of formula: $[(CH_3)_3SiO]_2(HO)P=O$, and
0–70% of trisilyl phosphate of formula: $[(CH_3)_3SiO]_3P=O$,
the total amount being 100% by weight.

10. The process of claim 1, wherein said organosilicon compound (B) comprises siloxane(s) (B') of the formula $$R^1OR_2SiO(R_2SiO)_x SiR_2OR^1 \qquad (XI)$$

where x is an integer from 20 to 100.

11. The process of claim 1, wherein $R^1$ is a hydrogen atom or a methyl radical.

12. The process of claim 1, wherein one aminosilane (A) has the formula $$NH_2(CH_2)_2 NH_2(CH_2)_3 SiCH_3(OCH_3)_2.$$

13. The process of claim 1, wherein a $C_6$- to $C_{14}$-alcohol or a monoalkyl glycol ether is used as alcohol (D).

14. The process of claim 1, wherein a mixture of $C_{10}$- to $C_{12}$-alcohols is used as alcohol (D).

* * * * *